United States Patent [19]

Bailey et al.

[11] 3,969,435

[45] July 13, 1976

[54] PROCESS FOR FINISHING TETRAFLUOROETHYLENE-HEXAFLUOROPROPYLENE COPOLYMERS

[75] Inventors: Charles Eugene Bailey; Miguel Jacinto Roura, both of Parkersburg, W. Va.

[73] Assignee: E. I. Du Pont de Nemours and Company, Wilmington, Del.

[22] Filed: Apr. 3, 1975

[21] Appl. No.: 564,901

[52] U.S. Cl. .................................. 260/900; 526/255
[51] Int. Cl.[2] .................... C08L 27/18; C08L 27/20
[58] Field of Search ...................................... 260/900

[56] References Cited

UNITED STATES PATENTS 2,946,763 7/1960 Bro et al. ............................ 260/900
3,085,083 4/1963 Schreyer et al. ................... 260/87.5

*Primary Examiner*—Carman J. Seccuro

[57] ABSTRACT

It is known to heat treat melt-processible blends of copolymers of tetrafluoroethylene and hexafluoropropylene in the molten state at elevated temperatures for several hours in the presence of an atmosphere containing water vapor in order to remove volatile material from the copolymer and to improve the thermal stability of the copolymer. Such heating results in foaming of the molten copolymer which is undesirable. According to the process of this invention, the foaming can be reduced by employing a blend of two or more of the copolymers, at least one of which has a melt viscosity higher, and at least one of which has a melt viscosity lower, than the final desired viscosity of the treated blend.

8 Claims, 2 Drawing Figures

FOAMED PLUG HEIGHT OBSERVED WITH VARIOUS HIGH & LOW MELT VISCOSITY COPOLYMER BLENDS

PROCESS FOR FINISHING TETRAFLUOROETHYLENE-HEXAFLUOROPROPYLENE COPOLYMERS

FIELD OF THE INVENTION

This invention relates to a process for stabilizing fluorocarbon polymers, and, more specifically, to a process for reducing the foaming that occurs during the stabilization of melt-processible blends of copolymers of tetrafluoroethylene and hexafluoropropylene.

BACKGROUND OF THE INVENTION

Melt-processible copolymers of tetrafluoroethylene and hexafluoropropylene (TFE/HFP) have long been known, and can be prepared as described in Bro et al. U.S. Pat. No. 2,946,763. However, the stabilization of the copolymers, through freeing them of volatiles by heating, has remained a problem in the preparation procedures. Bro et al. teach the stabilization of the copolymers by heating them at 300°–400°C. for 0.15 to 30 hours.

Mallouk et al., U.S. Pat. No. 2,955,099, discloses that a change in melt viscosity may occur during the heat stabilization procedure of Bro et al.; and teaches that to stabilize the copolymers against this melt viscosity change, a small amount of a cationic metal compound should be added.

Schreyer, U.S. Pat. No. 3,085,083 adds still another improvement. Schreyer teaches that if the heat treatment is carried out at 200°–400°C. in the presence of water which is present in an amount of at least 2% by weight of the copolymer environment, stabilization is achieved through endcapping of the copolymer. Preferably, the Schreyer treatment is carried out at 340°–380°C. for 2-5 hours in air containing at least 3 weight percent water vapor. This preferred treatment will be referred to hereinafter as the humid heat treatment.

The procedures for improving the thermal stability of melt-processible TFE/HFP copolymers, as taught by the above-described patents, cause the volatilization of monomer and other gases and result in copolymers that are relatively stable to heat. Such volatilization causes the copolymers to foam and rise like bread dough. This effect can cause overflowing of the equipment used for the humid heat treatment, and consequently the foaming places a limit on the amount of copolymer which can be placed in the equipment. Thus, the foaming can limit the rate of production of the finished heat-stable copolymer.

SUMMARY OF THE INVENTION

It has now been found that a blend of melt-processible tetrafluoroethylene-hexafluoropropylene copolymers can reduce the foaming in the humid heat treatment if the blend contains:

A. 10–80% by weight of the blend of one or more of said copolymers having a melt viscosity that is:
   1. at least 50 percent greater than the melt viscosity desired in the treated blend;
   2. no more than five times the melt viscosity desired in the treated blend;
   3. at least $13 \times 10^4$ poise at 372°C.;

B. 10–80% by weight of the blend of one or more of said copolymers having a melt viscosity that is between $1 \times 10^4$ and $5 \times 10^4$ poise at 372°C., provided that the melt viscosity is no more than one-half the melt viscosity desired in the treated blend; and C. 0–33% by weight of the blend of one or more of said copolymers having a melt viscosity of between $5 \times 10^4$ and $13 \times 10^4$ poise at 372°C., wherein the total percent by weight of the blend comprises 100%.

Specifically the process of this invention is a process for heat stabilizing copolymers of tetrafluoroethylene and hexafluoropropylene which comprises heating between about 340°C. and about 380°C. for a time sufficient to drive off substantially all volatiles in an atmosphere of air containing between about 3% and about 20%, preferably between 3% and 6%, of water vapor, based on weight of atmosphere, a blend of melt-processible copolymers of tetrafluoroethylene and hexafluoropropylene having between about 6.75 and about 27 weight percent hexafluoroethylene, said blend containing:

A. 10–80% by weight of the blend of one or more of said copolymers having a melt viscosity that is:
   1. at least 50 percent greater than the melt viscosity desired in the treated blend;
   2. no more than five times the melt viscosity desired in the treated blend;
   3. at least $13 \times 10^4$ poise at 372°C.;

B. 10–80% by weight of the blend of one or more of said copolymers having a melt viscosity that is between $1 \times 10^4$ and $5 \times 10^4$ poise at 372°C., provided that the melt viscosity is no more than one-half the melt viscosity desired in the treated blend; and C. 0–33% by weight of the blend of one or more of said copolymers having a melt viscosity of between $5 \times 10^4$ and $13 \times 10^4$ poise at 372°C., wherein the total percent by weight of the blend comprises 100%.

DESCRIPTION OF THE DRAWINGS

FIG. 2 demonstrates that the higher the melt viscosity of the high-melt-viscosity component, the less of it is needed. FIG. 2 also demonstrates that for any given high-melt-viscosity component, less foaming occurs when it is present in increasing amounts.

DESCRIPTION OF THE INVENTION

TFE/HFP copolymers having a particularly desirable balance between physical properties and fabrication characteristics will have melt viscosities between $5 \times 10^4$ and $25 \times 10^4$ poise at 372°C. Accordingly, in this invention, the copolymers will be blended to produce a blend of melt viscosity of between $5 \times 10^4$ and $25 \times 10^4$ and preferably between $5 \times 10^4$ and $13 \times 10^4$ poise.

Figure 1:
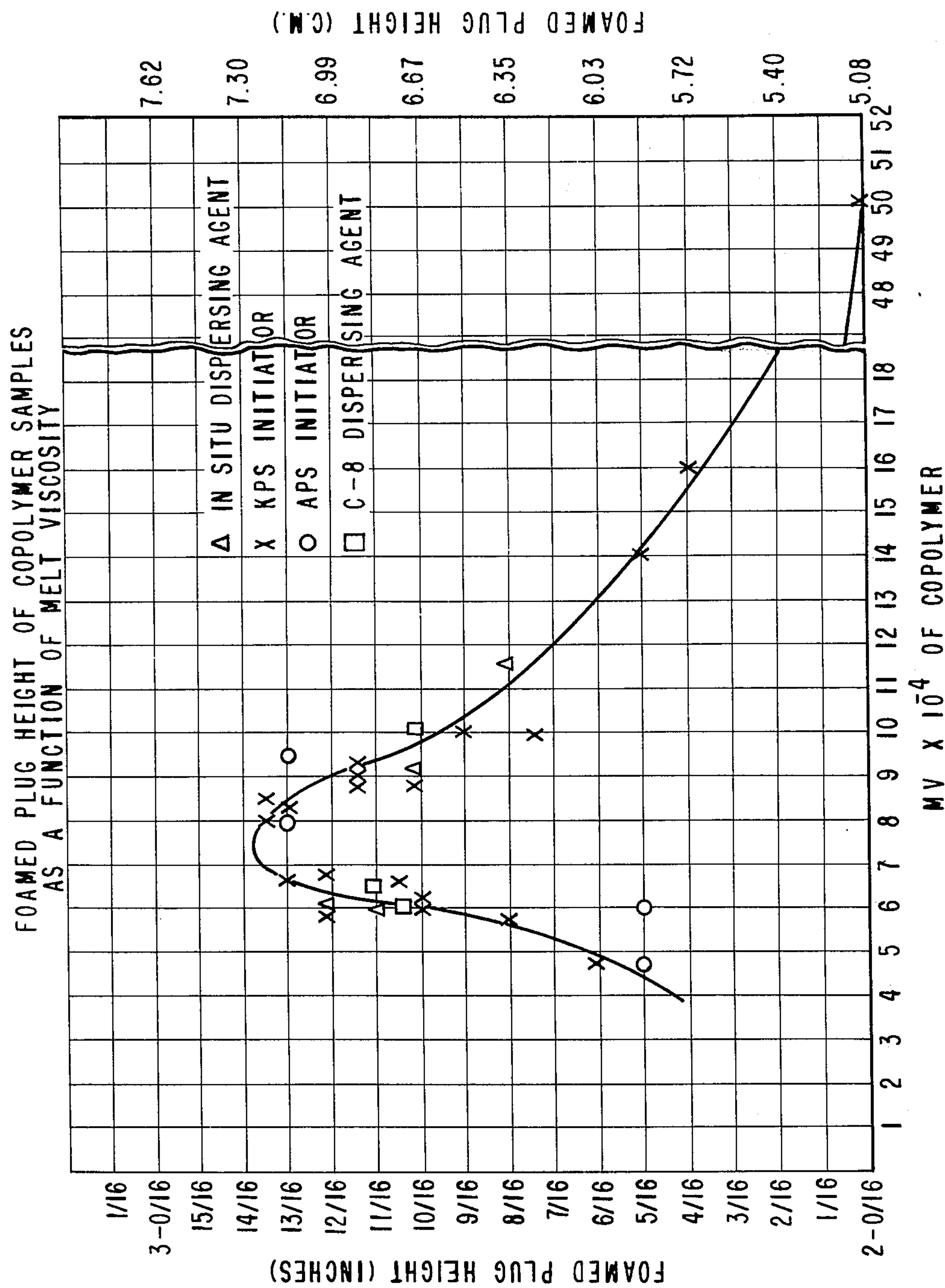
FIG. 1 is a graph which plots the height of the foam formed during the humid heat treatment of a number of TFE/HFP copolymers which have been polymerized by several procedures, viz, by changing the initiator or by altering the mode of dispersant addition. It is seen that regardless of the polymerization procedure used, the degree of foaming that occurs depends on the melt viscosity (MV) of the copolymer.

A study of the problem of foaming during the humid heat treatment of these desirable copolymers showed that the degree to which foaming occurs is strongly dependent on the melt viscosity of the homogeneous TFE/HFP copolymer subjected to the treatment. This is shown in FIG. 1. It is seen from FIG. 1 that a copolymer in which the final melt viscosity is below about $5 \times 10^4$ poise at 372°C. does not foam badly and that a copolymer in which the final melt viscosity is above about $13 \times 10^4$ poise at 372°C. does not foam badly either. It is hypothesized that when the viscosity is low, the bubbles formed by the gases driven off burst and collapse, thus reducing the foaming; while when the viscosity is high, the copolymer is too viscous to allow bubble expansion and thus the amount of foaming is reduced. FIG. 1 shows that foaming is worse at melt viscosities between about $5 \times 10^4$ and $13 \times 10^4$, yet it is within this viscosity range that blends of copolymers possess attractive and useful properties.

In the present invention, the high- and the low-viscosity copolymers are blended and subjected to the humid heat treatment. It is surprising that the degree of foaming is reduced by the blend because ordinarily the individual copolymer particles of the blend lose their identity in the melt, leading one to conclude that the degree of foaming would be determined by the melt viscosity of the blend, and not that of the blend's components.

The minimum amount of the high melt viscosity component of the blend is about 10% by weight of the blend and is preferably about 17%. These minimum amounts are adequate to provide significant reductions in the degree of foaming. The high melt viscosity component should have a melt viscosity of at least fifty percent greater, preferably twice greater, than that of the final blend desired, but in no case should the high viscosity component have a melt viscosity below $13 \times 10^4$ poise at 372°C. because copolymers between $5 \times 10^4$ and $13 \times 10^4$ poise have a relatively severe tendency to foam. The melt viscosity of the high melt viscosity component can be as much as about five times as high as the desired final melt viscosity of the blend; however, if it is much more than five times, the final product may contain excessive gel which becomes visible when thin film is extruded from the blend resin.

The blend may contain one high and one low melt viscosity component, or it may contain more than one high melt viscosity component, more than one low melt viscosity component and may also contain one or more components having the middle melt viscosity range (i.e. $5 \times 10^4$ to $13 \times 10^4$). The amount of the middle melt viscosity component present will be low, e.g., no more than about 33% by weight, preferably no more than about 20% and most preferably none.

The calculation of how much of each blend component to use in a preferred embodiment to obtain a desired melt viscosity (MV) at 372°C. of a final blend Z can be found by mixing N components A+B+ . . . N according to the following relationship:

$$kg_Z(MV)_Z^{\frac{1}{4.5}} = kg_A(MV_A)^{\frac{1}{4.5}} + kg_B(MV_B)^{\frac{1}{4.5}} \ldots kg_N(MV_N)^{\frac{1}{4.5}}$$

This calculation provides the melt viscosity of a final blend ($MV_Z$) assuming no viscosity change occurs during the humid heat treatment and extrusion processes. Actually, melt viscosity will change during such treatment and processes and the calculation must be adjusted in practice in accordance with the viscosity change. For example, if the melt viscosity has been found to be decreasing during such treatment or processes by about $4 \times 10^4$ poises and the final desired viscosity of the blend is $8 \times 10^4$ poise, the blend would be calculated on the basis of a melt viscosity of $12 \times 10^4$ poises. "kg" equals kilograms.

It has been found that in another preferred embodiment, when a final melt viscosity of $8 \times 10^4$ poise is desired (calculated basis), good results are obtained if: (1) the high melt viscosity component comprises 20–40 weight percent of the blend and its melt viscosity at 372°C. is $25 \times 10^4$ to $30 \times 10^4$ poise, or (2) the high melt viscosity component comprises 30–50weight percent of the blend and its melt viscosity at 372°C. is $20 \times 10^4$ to $25 \times 10^4$ poise, or (3) the high melt viscosity component comprises 30–80 weight percent of the blend and its melt viscosity is $15 \times 10^4$ to $20 \times 10^4$ poises.

The TFE/HFP copolymer used has a hexafluoropropylene content high enough that the copolymer is melt-processible and low enough that it is a plastic rather than an elastomer. The hexafluoropropylene content should be between about 6.75 and about 27 weight percent of the copolymer and preferably between about 14 and about 18 weight percent. The copolymers are prepared by reacting tetrafluoroethylene and hexafluoropropylene in an aqueous system containing a dispersing agent and a free radical polymerization initiator according to procedures disclosed in Couture U.S. Pat. No. 3,132,124. By varying the amount of initiator, copolymers of varying melt viscosity can be obtained. For example, to obtain copolymers of high melt viscosity, the amount of initiator is decreased; and to obtain copolymers of low melt viscosity, it is increased.

As mentioned previously, in the humid heat treatment employed herein, the blend is heated at an oven temperature between about 340°C. and about 380°C. for between about 2 and 5 hours in an atmosphere of air at about atmospheric pressure containing between about 3% and about 20%, preferably 6%, of water vapor, based on weight of atmosphere. Pressure is not critical and usually atmospheric pressure is used.

Melt viscosity as recorded in the following Examples, was measured according to American Society of Testing Materials test D-1238-52T, modified as follows: The cylinder, orifice and piston tip are made of a corrosion-resistant alloy, Haynes Stellite 19, made by Haynes Stellite Co. The 5.0 g sample is charged to the 9.53 mm (0.375 inch) inside diameter cylinder, which is maintained at 372°C. ± 1°C. Five minutes after the sample is charged to the cylinder it is extruded through a 2.10 mm (0.0825 inch) diameter, 8.00 mm (0.315 inch) long square-edge orifice under a load (piston plus weight) of 5000 grams. This corresponds to a shear stress of 0.457 kilograms per square centimeter (6.5 pounds per square inch). The melt viscosity in poises is calculated as 53150 divided by the observed extrusion rate in grams per minute.

All references to melt viscosity made hereinabove and hereinafter refer to melt viscosity measured at 372°C.

In the following examples the polymer used was a copolymer of tetrafluoroethylene and about 16 wt. % hexafluoropropylene polymerized according to the general procedure set forth in U.S. Pat. No. 3,132,124. After coagulation by high shear agitation, the copolymer fluff appeared dry but actually contained considerable water. Excess water was removed by placing 100g of the copolymer in a cylindrical mold about 14 cm in diameter, the bottom of the mold containing absorbent paper. On top of the paper was placed a wire screen and then a glass cloth. The mold was closed and pressed at 700 kg/cm$^2$ to remove excess water (about 10% moisture remained). A sample of the copolymer was oven dried at 125°C. for 4–5 hours for use in determining the melt viscosity of the compacted fluff.

For the humid heat treatment, aluminum test tubes 1.9 cm in diameter were made by shaping aluminum foil to the outside of a glass test tube. A weighed sample of compacted fluff was placed in an aluminum test tube. The aluminum test tube was placed inside a 2.5 cm glass test tube which was placed in a hole in a massive metal block maintained at a constant temperature. Air was passed through a water bubbler in a 40°C. thermostat and into the aluminum tube at a rate of 150 ml/min. At the end of a predetermined time the glass test tube was removed from the metal block and cooled in air. Then the aluminum was peeled from the foamed polymer and the height and melt viscosity of the foamed polymer sample were measured.

COMPARATIVE EXAMPLE A

This comparative example shows that melt viscosity is a very influential variable in determining the amount of foaming. The copolymers were prepared by the general method described in Couture U.S. Pat. No. 3,132,124. Some of the copolymers used in this example were made using ammonium persulfate (APS) initiator; others were made with potassium persulfate (KPS); some were made with ammonium perfluorooctanoate (C-8) as the dispersing agent; others used the dispersing agent prepared in situ according to U.S. Pat. No. 1,132,124. These variables proved to be unimportant since all the data fit the smooth curve shown in FIG. 1. In this example the sample size was 7.0g, the metal block was at 370°C., and the tube was in the block for 2 hours. In FIG. 1 the ordinate is the height of the foamed sample after it has cooled and the aluminum has been peeled off. The abscissa is the melt viscosity of the final product, measured on a sample from each foamed sample. This Comparative Example shows that severe foaming occurs at 370°C. in making final product with a melt viscosity of between about $5 \times 10^4$ and $13 \times 10^4$ poises. Polymer of melt viscosity below $5 \times 10^4$ or above $13 \times 10^4$ is not nearly as severe in foaming tendency.

COMPARATIVE EXAMPLE B

A copolymer was prepared by polymerizing tetrafluoroethylene and hexafluoropropylene in an aqueous medium using a persulfate initiator and a perfluorinated dispersing agent. The copolymer contained about 16 % by weight hexafluoropropylene.

For the humid heat treatment, the sample size was 5.0g, the metal block was at 350°C. and the tube was in the block for 2 hours. The melt viscosity was $10.2 \times 10^4$ poise, and the height of the foamed sample was 2 inches (5.08 cm) in each of two duplicate runs.

EXAMPLES 1–6

The copolymers used in these examples were prepared like the one used in Comparative Example B except that the amount of initiator was varied to obtain copolymers of various melt viscosities. For the humid heat treatment, the sample size, temperature and time were the same as in Comparative Example B. Samples of copolymer fluff of varying melt viscosity were blended as shown in Table I. The fluff samples were blended with the objective of obtaining final melt viscosities of about $10 \times 10^4$ poise. Table I shows that the blends did not foam nearly as much as did the copolymer used in Comparative Example B.

Figure 2:
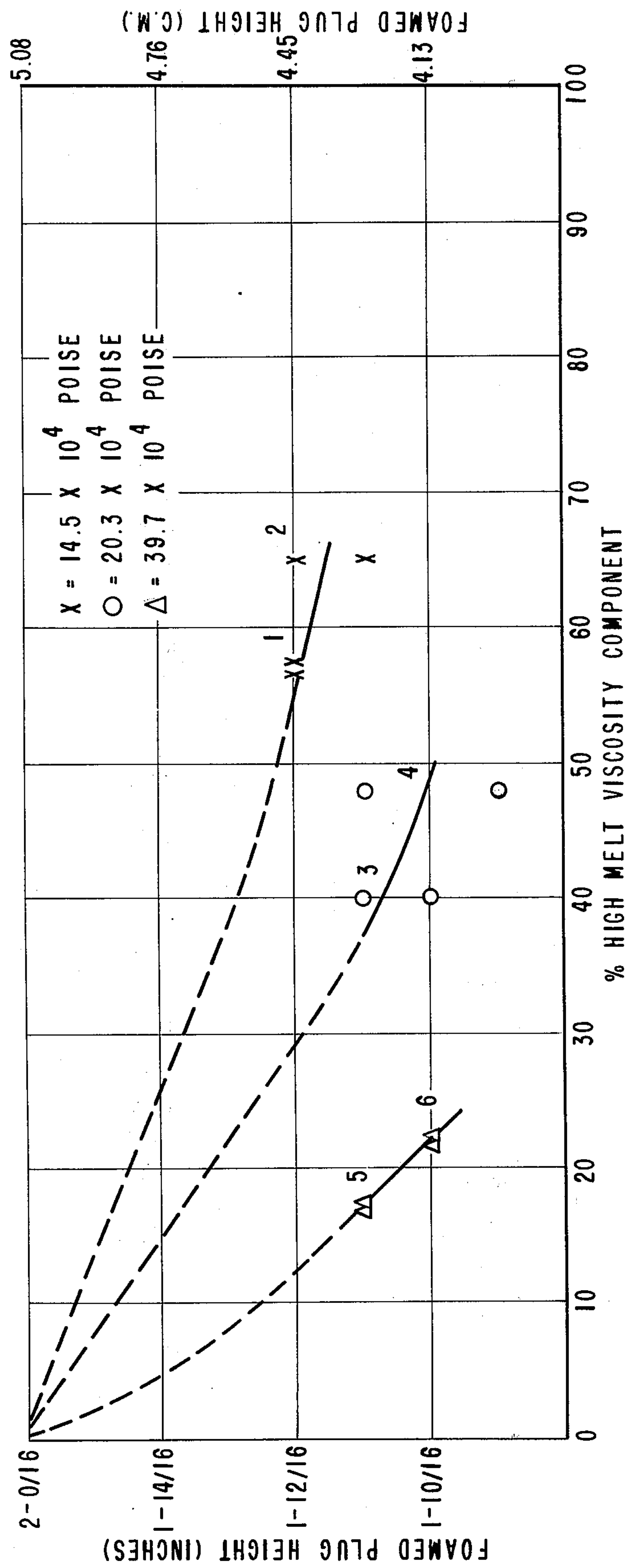
FIG. 2 is a graph which plots the height of the foam formed during the humid heat treatment of the blends used in Examples 1–6 versus the % amount of the high melt viscosity component of the blend used.

The results of Examples 1–6 are plotted in FIG. 2. The ordinate is the height of the foamed sample. The abscissa is the % of the higher melt viscosity compacted fluff in the blends of Examples 1–6. The points on FIG. 2 are identified with the Example number.

Examples 1 and 2 use compacted fluff of $14.5 \times 10^4$ poise as the high melt viscosity component. On FIG. 2 a curve has been drawn through these points. It has been extrapolated to a foamed sample height value of 2 inches (5.08 cm) because that is the foamed sample height obtained in Comparative Example B.

Similarly, the points for Examples 3 and 4 have been connected by a curve. Also the points for Examples 5 and 6 have been connected by a curve.

FIG. 2 shows that the more viscous the high melt viscosity component of the blend is, the smaller the required amount of that component.

FIG. 2 also shows that for a given high-viscosity component blended with various low-viscosity components in amounts required to give a relatively constant viscosity of the heat-treated blend, less foaming is observed when the high-vicosity component is present in greater amounts.

Table I sets forth the amounts and melt viscosities of the copolymers employed, the melt viscosity of the treated blend obtained and the height of the foam formed.

TABLE I

| Example | Blend | Components | MV of Blend* | Foamed Plug Height (duplicate runs) (in.) | (cm.) |
|---|---|---|---|---|---|
| 1 | 57g | $14.5 \times 10^4$ p | $10.1 \times 10^4$ p | 1-12/16, 1-12/16 | 4.45—4.45 |
| | 43g | $4.1 \times 10^4$ p | | | |
| 2 | 65g | $14.5 \times 10^4$ p | $9.7 \times 10^4$ p | 1-11/16, 1-12/16 | 4.29–4.45 |
| | 35g | $1.5 \times 10^4$ p | | | |
| 3 | 40g | $20.3 \times 10^4$ p | $10.6 \times 10^4$ p | 1-11/16, 1-10/16 | 4.29–4.13 |
| | 60g | $4.1 \times 10^4$ p | | | |
| 4 | 48g | $20.3 \times 10^4$ p | $10.2 \times 10^4$ p | 1-11/16, 1-9/16 | 4.29–3.97 |
| | 52g | $1.5 \times 10^4$ p | | | |
| 5 | 17g | $39.7 \times 10^4$ p | $9.3 \times 10^4$ p | 1-11/16, 1-11/16 | 4.29—4.29 |
| | 83g | $4.1 \times 10^4$ p | | | |
| 6 | 22g | $39.7 \times 10^4$ p | $8.7 \times 10^4$ p | 1-10/16, 1-10/16 | 4.13—4.13 |

TABLE I-continued

| Example | Blend | Components | MV of Blend* | Foamed Plug Height (duplicate runs) (in.) | (cm.) |
|---|---|---|---|---|---|
| | 78g | $1.5 \times 10^4$ p | | | |

*Found by combining the two duplicate runs

The copolymers obtained by this invention have good high temperature stability, good electrical insulating properties, chemical inertness and toughness. They can be melt extruded into a variety of shaped articles such as films, filaments, tubing, wire covering and other items for use in applications where the aforecited properties are desirable.

The embodiments of the invention in which an exclusive property or privilege is claimed are defined as follows:

1. A process for heat stabilizing copolymers of tetrafluoroethylene and hexafluoropropylene which comprises heating between about 340°C. and about 380°C. for a time sufficient to drive off substantially all volatiles in an atmosphere of air containing between about 3% and about 20% of water vapor, based on weight of atmosphere, a blend of melt-processible copolymers of tetrafluoroethylene and hexafluoropropylene having between about 6.75 and about 27 weight percent hexafluoropropylene, said blend containing:

A. 10–80% by weight of the blend of one or more of said copolymers having a melt viscosity that is:
  1. at least 50 percent greater than the melt viscosity desired in the treated blend;
  2. no more than five times the melt viscosity desired in the treated blend;
  3. at least $13 \times 10^4$ poise at 372°C.;

B. 10–80% by weight of the blend of one or more of said copolymers having a melt viscosity that is between $1 \times 10^4$ and $5 \times 10^4$ poise at 372°C., provided that the melt viscosity is no more than one-half the melt viscosity desired in the treated blend; and C. 0–33% by weight of the blend of one or more of said copolymers having a melt viscosity of between $5 \times 10^4$ and $13 \times 10^4$ poise at 372°C., wherein the total percent by weight of the blend comprises 100%.

2. The process of claim 1 wherein the minimum amount of component (A) present is 17 weight percent of said blend.

3. The process of claim 1 wherein no component (C) is present in the blend.

4. The process of claim 1 wherein the amount of component (A) present is between about 30% and about 80% by weight of said blend and the melt viscosity of the copolymers of component (A) is between about $15 \times 10^4$ and about $20 \times 10^4$ poises at 372°C.

5. The process of claim 1 wherein, in Component (A) of the blend, the melt viscosity of said copolymers is
  1. at least twice as great as the melt viscosity desired in the treated blend;
  2. no more than five times the melt viscosity desired in the treated blend;
  3. at least $13 \times 10^4$ poise at 372°C.

6. The process of claim 1 wherein the amount of component (A) present is between about 20% and about 40% by weight of said blend and the melt viscosity of the copolymers of Component (A) is between about $25 \times 10^4$ and about $30 \times 10^4$ poise at 372°C.

7. The process of claim 1 wherein the amount of component (A) present is between about 30% and about 50% by weight of said blend and the melt viscosity of the copolymers of component (A) is between about $20 \times 10^4$ and about $25 \times 10^4$ poise at 372°C.

8. The process of claim 1 wherein the melt viscosity desired in the treated blend is between about $6 \times 10^4$ and about $13 \times 10^4$ poises at 372°C.

* * * * *